United States Patent
Sato

(10) Patent No.: US 10,497,987 B2
(45) Date of Patent: Dec. 3, 2019

(54) PRODUCTION METHOD OF ELECTRODE FOR SECONDARY BATTERY, ELECTRODE FOR SECONDARY BATTERY, AND SECONDARY BATTERY

(71) Applicant: NEC ENERGY DEVICES, LTD., Sagamihara-shi, Kanagawa (JP)

(72) Inventor: Tetsuya Sato, Kanagawa (JP)

(73) Assignee: Envision AESC Energy Devices Ltd., Sagamihara-shi, Kanagawa (JP)

( * ) Notice: Subject to any disclaimer, the term of this patent is extended or adjusted under 35 U.S.C. 154(b) by 214 days.

(21) Appl. No.: 15/520,658

(22) PCT Filed: Aug. 7, 2015

(86) PCT No.: PCT/JP2015/072445
§ 371 (c)(1),
(2) Date: Apr. 20, 2017

(87) PCT Pub. No.: WO2016/067706
PCT Pub. Date: May 6, 2016

(65) Prior Publication Data
US 2017/0317390 A1  Nov. 2, 2017

(30) Foreign Application Priority Data
Oct. 27, 2014 (JP) .................................. 2014-218149

(51) Int. Cl.
*H01M 10/42* (2006.01)
*H01M 10/0585* (2010.01)
(Continued)

(52) U.S. Cl.
CPC ......... *H01M 10/4235* (2013.01); *H01M 2/08* (2013.01); *H01M 10/0525* (2013.01); *H01M 10/0585* (2013.01)

(58) Field of Classification Search
None
See application file for complete search history.

(56) References Cited

U.S. PATENT DOCUMENTS

| 2006/0093922 A1* | 5/2006 | Kim ............... H01M 2/0275 429/251 |
| 2012/0196172 A1 | 8/2012 | Maeda et al. |
| 2014/0255778 A1 | 9/2014 | Huh et al. |

FOREIGN PATENT DOCUMENTS

| JP | 2003-151535 A | 5/2003 |
| JP | 2009-134915 A | 6/2009 |

(Continued)

OTHER PUBLICATIONS

International Search Report of PCT/JP2015/072445, dated Nov. 2, 2015. [PCT/ISA/210].

(Continued)

*Primary Examiner* — Helen Oi K Conley
(74) *Attorney, Agent, or Firm* — Sughrue Mion, PLLC

(57) ABSTRACT

The present invention relates to a production method of an electrode for a secondary battery which has an electrode laminated assembly that has a configuration in which electrodes and a separator are laminated. An insulating member is formed on border portion (4) between an application portion and a non-application portion by attaching insulating solution (40a) which contains a solid insulating material to border portion (4) and then solidifying the insulating solution (40a).

7 Claims, 5 Drawing Sheets

(51) Int. Cl.
    *H01M 10/0525*     (2010.01)
    *H01M 2/08*     (2006.01)

(56) References Cited

FOREIGN PATENT DOCUMENTS

| JP | 2012-74359 A | 4/2012 |
|----|--------------|--------|
| JP | 2012-178326 A | 9/2012 |
| WO | 2013/145876 A1 | 10/2013 |
| WO | 2014/050988 A1 | 4/2014 |
| WO | 2014/142458 A1 | 9/2014 |
| WO | 2015/087657 A1 | 6/2015 |

OTHER PUBLICATIONS

Communication dated May 28, 2019, from the Japanese Patent Office in counterpart Application No. 2016-556401.

* cited by examiner

US 10,497,987 B2

PRODUCTION METHOD OF ELECTRODE FOR SECONDARY BATTERY, ELECTRODE FOR SECONDARY BATTERY, AND SECONDARY BATTERY

CROSS REFERENCE TO RELATED APPLICATIONS

This application is a National Stage of International Application No. PCT/JP2015/072445 filed Aug. 7, 2015, claiming priority based on Japanese Patent Application No. 2014-218149, filed Oct. 27, 2014, the contents of all of which are incorporated herein by reference in their entirety.

TECHNICAL FIELD

The present invention relates to a production method of an electrode for a secondary battery, an electrode for a secondary battery, and a secondary battery.

BACKGROUND ART

Secondary batteries have been widely spread not only as power sources of portable devices such as mobile phones, digital cameras and laptop computers but also as vehicle or household power sources. In particular, a lightweight lithium ion secondary battery with a high-energy density is an energy storage device that is indispensable for our life. The lithium ion battery can be roughly categorized as a wound type battery or a laminated type battery. An electrode element of the wound-type battery has a structure in which a long positive electrode sheet and a long negative electrode sheet are wound multiple times in a state of being overlapped with separators respectively interposed therebetween. An electrode element of the laminated-type battery has a structure in which positive electrode sheets and negative electrode sheets are laminated alternately and repeatedly with separators respectively interposed therebetween. The positive electrode sheet and the negative electrode sheet each include an application portion where an active material layer (including a case of a mixture agent including a binding agent, a conductive material and the like as well as an active material) is formed on a current collector, and a non-application portion where the active material layer is not formed for the connection with an electrode terminal.

In each of the wound-type secondary battery and the laminated-type secondary battery, together with an electrolyte, the electrode element is accommodated and sealed in an outer container (outer case). Then, one end of a positive electrode terminal is electrically connected with the non-application portion of the positive electrode sheet while the other end is led out of the outer container, and one end of a negative electrode terminal is electrically connected with the non-application portion of the negative electrode sheet while the other end is led out of the outer container. With yearly improvements in battery technology, the trend is for annual increase in the capacity of the secondary batteries. What this means is that, should a short circuit occur, the amount of generated heat will increase which, in turn, increases safety risks. Therefore, measures to improve battery safety become more and more important.

FIG. 1 is a cross-section view that shows an example of a safety measure that is implemented to prevent the occurrence of a short circuit in the secondary battery. In FIG. 1, insulating tape 400 covers border portion 4 between an application portion where active material layer 200 is formed on current collector 300 and a non-application portion where active material layer 200 is not formed on current collector 300, and thereby, a short circuit is prevented.

Further, Patent Document 1 proposes a technology that uses a flexible insulating member for the border portion between the application portion and the non-application portion in the wound-type battery and can thus prevent damage to the insulating member when the electrodes are wound.

Moreover, Patent Document 2 discloses a technology that discharges an insulating member from an ink-jet coating device and attaches the insulating member to the border portion between the application portion and the non-application portion.

PRIOR ART DOCUMENT

Patent Document

Patent Document 1: JP2009-134915A
Patent Document 2: WO2013/145876

SUMMARY OF INVENTION

FIG. 2 is an enlarged view of the interface between insulating tape 400 and active material layer 200 shown in FIG. 1. As shown in FIG. 2, concavities and convexities formed by active material particles are generated on the surface of active material layer 200. Therefore, even when insulating tape 400 is attached to the surface of active material layer 200, insulating tape 400 cannot come in contact with concave portions on the surface of active material layer 200. As a result, the adhesion between insulating tape 400 and active material layer 200 is insufficient, and there is a possibility that insulating tape 400 will peel off from active material layer 200.

Patent Document 1 does not disclose a way to solve the problem in which the insulating member peels off, which is a concern in the process of forming insulating members on the surface of the active material layer.

Further, even in the case of applying the technology described in Patent Document 2 to discharge a resin solution from the ink-jet coating device to form the insulating member, the same problem will occur in which the insulating member peels off from the active material layer. The reason for this peel off is thought to be the lack of sufficient adhesive force because the resin solution which is discharged on the surface of the active material layer from the ink-jet coating device has a high surface tension and because the wettability between the discharged resin solution and the active material layer is not sufficient.

An object of the present invention is to provide a production method of an electrode for a secondary battery, an electrode for a secondary battery, and a secondary battery, in which the insulating member is prevented from easily peeling off from the active material layer.

A production method of an electrode for a secondary battery according to one aspect of the present invention, the secondary battery having an electrode laminated assembly that has a configuration in which electrodes and a separator are laminated, each of the electrodes including an application portion and a non-application portion, the application portion being a portion where an active material layer is formed on a current collector, the non-application portion being a portion where the active material layer is not formed on the current collector, comprises forming an insulating member on a border portion between the application portion and the non-application portion by attaching an insulating solution to the border portion and then solidifying the insulating solution, the insulating solution containing a solid insulating material.

An electrode for a secondary battery according to one aspect of the present invention, comprising: a current collector; an active material layer that is formed on a part of said current collector; and an insulating member that results from attaching an insulating solution to a border portion between an application portion and a non-application portion and then solidifying the insulating solution, the insulating solution containing a solid insulating material, the application portion being a portion where said active material layer is formed on said current collector, the non-application portion being a portion where said active material layer is not formed on said current collector.

A secondary battery according to one aspect of the present invention, comprising: an electrode laminated assembly that has a configuration in which electrodes and a separator are laminated; and an outer container that accommodates said electrode laminated assembly together with electrolyte, at least one of the electrodes included in said electrode laminated assembly being the abovementioned electrode for the secondary battery.

DESCRIPTION OF EXEMPLARY EMBODIMENTS

Hereinafter, exemplary embodiments of the present invention will be described with use of the drawings.

[Basic Structure of Secondary Battery]

Figure 1:
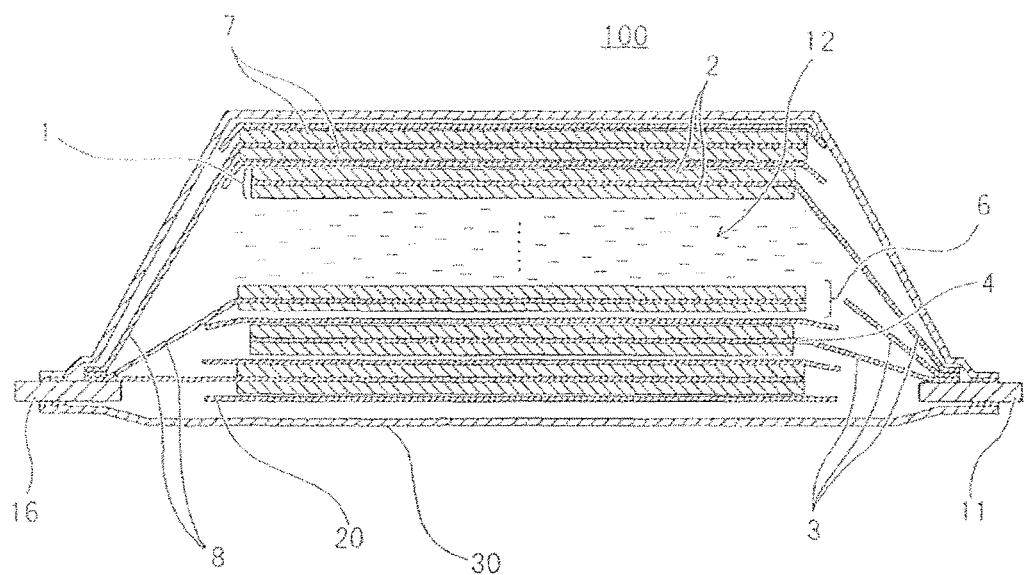
FIG. 1 is a cross-section view that shows an example of a safety measure that is implemented to prevent the occurrence of a short circuit in the secondary battery.
Figure 2:
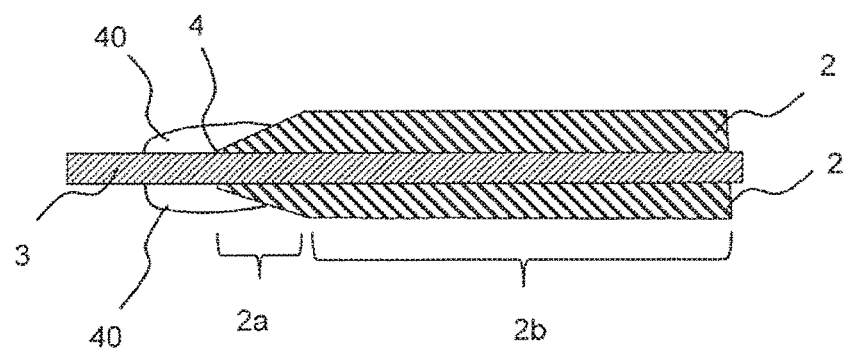
FIG. 2 is an enlarged view of the interface between insulating tape and a positive electrode active material layer in an electrode shown in FIG. 1.
Figure 3:
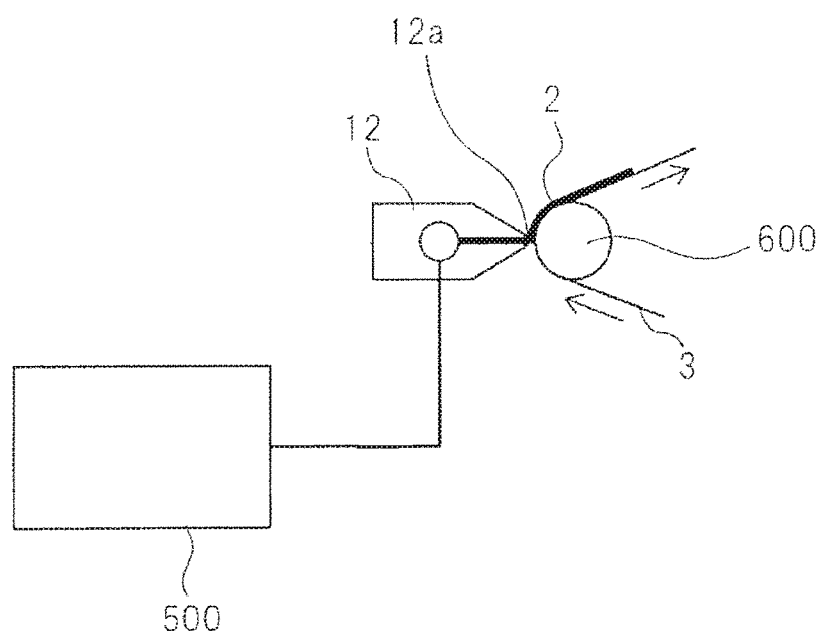
FIG. 3 is a cross-section view that shows the basic structure of a laminated-type secondary battery of the present invention.

FIG. 3 schematically shows an example of the configuration of a laminated-type lithium ion secondary battery for which the present invention is employed. Lithium ion secondary battery 100 in the present invention includes an electrode laminated assembly (battery element) in which a pair of electrodes, that is, positive electrodes (positive electrode sheets) 1 and negative electrodes (negative electrode sheets) 6 are alternately laminated with separators 20 interposed therebetween. The electrode laminated assembly is accommodated in an outer container made of flexible film 30, together with electrolyte 12. One end of positive electrode terminal 11 is connected with positive electrode 1 of the electrode laminated assembly, and one end of the negative electrode terminal 16 is connected with negative electrode 6. The other end of positive electrode terminal 11 and the other end of negative electrode terminal 16 each are led out of flexible film 30. In FIG. 3, the illustration of a part of the layers configuring the electrode laminated assembly (layers positioned at an intermediate portion in the thickness direction) is omitted, and electrolyte 12 is illustrated.

Figure 4:
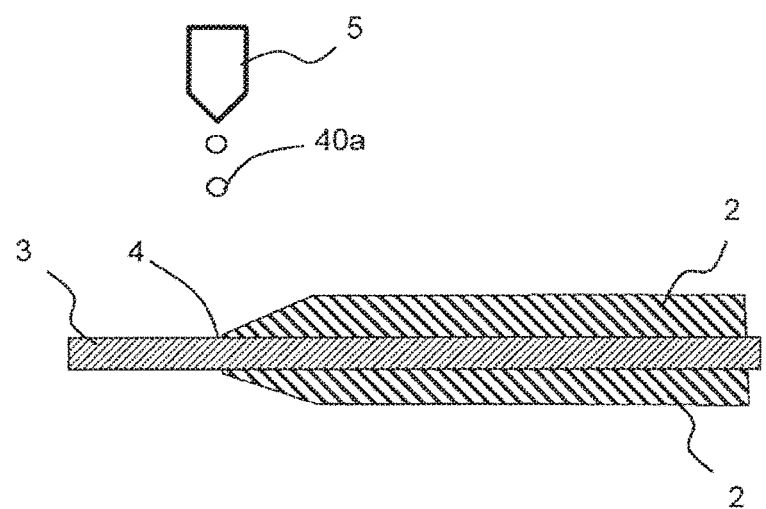
FIG. 4 is an enlarged lateral view that shows the main part of the positive electrode of the secondary battery shown in FIG. 3.

Electrodes 1, 6 include current collectors 3, 8 and active material layers 2, 7 formed on current collectors 3, 8, respectively. That is, positive electrode 1 includes positive electrode current collector 3 and positive electrode active material layer 2 formed on positive electrode current collector 3, and on the front surface and back surface of positive electrode current collector 3, an application portion where positive electrode active material layer 2 is formed and a non-application portion where positive electrode active material layer 2 is not formed are positioned so as to be arrayed along the longitudinal direction. As shown in FIG. 4, positive electrode active material layer 2 includes thick-layer portion 2b that is the major portion and where the thickness is large, and thin-layer portion 2a that is provided at an edge portion of a border portion with the non-application portion and where the thickness is small. Thin-layer portion 2a has a shape that is gently inclined toward thick-layer portion 2b. However, thin-layer portion 2a may have a flat shape, and the border portion between thin-layer portion 2a and thick-layer portion 2b may be a step shape that is nearly vertical. Further, an outer edge portion of thin-layer portion 2a may be slightly inclined, or may be substantially vertical with respect to positive electrode current collector 3.

As shown in FIG. 3, negative electrode 6 includes negative electrode current collector 8 and negative electrode active material layer 7 formed on negative electrode current collector 8, and on the front surface and back surface of negative electrode current collector 8, the application portion and the non-application portion are positioned so as to be arrayed along the longitudinal direction. The application portion (negative electrode active material 8) of negative electrode 6 is configured by the thick-layer portion, and the thin-layer portion is not present. An edge portion of the application portion (negative electrode active material layer 8) may be slightly inclined, or may be substantially vertical with respect to negative electrode current collector 7.

In the following description, an exemplary configuration in which only positive electrode 1 includes thin-layer portion 2a and thick-layer portion 2b and in which insulating member 40 is attached to only positive electrode 1 will be described. However, a configuration in which both positive electrode 1 and negative electrode 6 include the thin-layer portion and the thick-layer portion and in which insulating members 40 are attached to both electrodes may be adopted, and further, a configuration in which only negative electrode 6 includes the thin-layer portion and the thick-layer portion and in which insulating member 40 is attached to only negative electrode may be adopted.

Insulating member 40 is a member that results from solidifying an insulating solution that contains a solid insulating material. In the exemplary embodiment, the insulating solution is a resin solution. The concentration is 0.5 wt % to 5 wt %, and the viscosity is about 100 mPa·S. Meanwhile, the solid insulating material is a metal oxide, as exemplified by titanium dioxide, aluminum oxide, and zirconium oxide. The content of the metal oxide in the resin solution is about 1 to 5 wt %.

The use of the metal oxide as the solid insulating material provides the following advantages (1) to (3).
(1) Good chemical resistance and strength because of a covalent bond
(2) High insulation properties because of an oxide
(3) Little influence on human bodies because of chemically stable materials Each non-application portion of positive electrodes 1 and negative electrodes 6 is used as a tab for the connection with the electrode terminal (positive electrode terminal 11 or negative electrode terminal 16). Positive electrode tabs connected with positive electrodes 1 are collected on positive electrode terminal 11, and are connected with each other by ultrasonic welding or the like, together with positive electrode terminal 11. Negative electrode tabs connected with negative electrodes 6 are collected on negative electrode terminal 16, and are connected with each other by ultrasonic welding or the like, together with negative electrode terminal 16. Then, the other end of positive electrode terminal 11 and the other end of negative electrode terminal 16 each are led out of the outer container.

Insulating member 40 for preventing the short circuit with negative electrode terminal 16 is formed so as to cover border portion 4 between the application portion and non-application portion of positive electrode 1. Insulating member 40 is formed so as to cover border portion 4 across both the positive electrode tab (non-application portion) and thin-layer portion 2a of positive electrode active material 2 (application portion).

The external dimensions of the application portion (negative electrode active material layer 7) of negative electrode 6 are larger than the external dimensions of the application portion (positive electrode active material layer 2) of positive electrode 1, and are smaller than the external dimensions of separator 20.

In the secondary battery, examples of the material composing positive electrode active material layer 2 include layered oxide materials such as $LiCoO_2$, $LiNiO_2$, $LiNi_{(1-x)}CoO_2$, $LiNi_x(CoAl)_{(1-x)}O_2$, $Li_2MnO_3$—$LiMO_2$ (here, M is a transition metal, and examples thereof include Ni, Co, Fe, Cr) and $LiNi_{1/3}Co_{1/3}Mn_{1/3}O_2$, spinel materials such as $LiMn_2O_4$, $LiMn_{1.5}Ni_{0.5}O_4$ and $LiMn_{(2-x)}M_xO_4$, olivine materials such as $LiMPO_4$, olivine fluoride materials such as $Li_2MPO_4F$ and $Li_2MSiO_4F$, and vanadium oxide materials such as $V_2O_5$, and mixtures of one kind or two or more kinds of these materials can be used.

Examples of the material composing negative electrode active material layer 7 include carbon materials such as graphite, amorphous carbon, diamond-like carbon, fulleren, carbon nanotubes and carbon nanohorns, lithium metal materials, alloy materials of silicon, tin or the like, oxide materials such as $Nb_2O_5$ and $TiO_2$, or compounds of these materials can be used.

The material composing positive electrode active material layer 2 and negative electrode active material layer 7 may be a mixture agent in which a binding agent, a conductive auxiliary agent or the like is added when appropriate. As the conductive auxiliary agent, combinations of one kind or two or more kinds of carbon black, carbon fiber, graphite and the like can be used. Further, as the binding agent, polyvinylidene fluoride (PVDF), polytetrafluoroethylene, carboxymethyl cellulose, modified acrylonitrile rubber particles or the like can be used.

As positive electrode current collector 3, aluminum, stainless steel, nickel, titanium, alloys of these materials, or the like can be used, and particularly, aluminum is preferable.

As negative electrode current collector 8, copper, stainless steel, nickel, titanium, or alloys of these materials can be used.

As electrolyte 12, mixtures of one kind or two or more kinds of organic solvents including cyclic carbonates such as ethylene carbonate, propylene carbonate, vinylene carbonate and butylene carbonate, chain carbonates such as ethyl methyl carbonate (EMC), diethyl carbonate (DEC), dimethyl carbonate (DMC) and dipropyl carbonate (DPC), aliphatic carboxylate esters, γ-lactones such as γ-butyrolactone, chain ethers, and cyclic ethers can be used. Furthermore, in the organic solvents, lithium salt may be dissolved.

Separator 20 is mainly composed of a porous membrane, a woven fabric, an unwoven fabric or the like that is made of a resin. As the resin component, for example, polyolefin resins such as polypropylene and polyethylene, polyester resins, acrylic resins, styrene resins, nylon resins, and the like can be used. Particularly, polyolefin microporous membranes are preferable because of having excellent ion permeability and characteristics that enable physically separating the positive electrode and the negative electrode. Further, as necessary, a layer containing inorganic particles may be formed on separator 20. Examples of the inorganic particles include insulating oxides, nitrides, sulfides, carbides and others, and in particular, it is preferable that the layer contain $TiO_2$ or $Al_2O_3$.

As the outer container, a case formed of flexible film 30, a can case and the like can be used, and from the standpoint of reducing battery weight, it is preferable to use flexible film 30. As flexible film 30, a film in which resin layers are provided on the front surface and back surface of a metal layer which is a base can be used. As the metal layer, a metal layer having a barrier property for preventing the leakage of electrolyte 12 and for the intrusion of moisture from the outside can be selected, and aluminum, stainless steel and the like can be used (particularly, aluminum is preferable). On at least one surface of the metal layer, a heat-adhesive resin layer of modified polyolefin or the like is provided. The heat-adhesive resin layers of flexible films 30 are provided so as to face each other, and the periphery of a portion where the electrode laminated assembly is accommodated is heat-sealed, so that the outer container is formed. Resin layers composed of a nylon film, a polyester film or the like may be provided on the outer container surface opposite to the surface on which the heat-adhesive resin layer is formed.

For positive electrode terminal 11, materials composed of aluminum or aluminum alloys can be used, and for negative electrode terminal 16, copper, copper alloys, nickel-plated copper or nickel-plated copper alloy, or the like can be used. The other end side of each of terminals 11, 16 is led out of the outer container. In each of terminals 11, 16, a heat-adhesive resin may be previously provided in a portion corresponding to the heat-welded portion of the outer periphery portion of the outer container.

[Detailed Structure of Positive Electrode]

FIG. 4 is an outline cross-section view for describing an exemplary embodiment of the lithium ion secondary battery in the present invention, and schematically describes a part of the electrode laminated assembly in an enlarged manner.

Although the illustration is omitted in FIG. 3, positive electrode active material layer 2 in the exemplary embodiment, as shown in FIG. 4, includes thick-layer portion 2b that is positioned near the central portion and that has a roughly even thickness equivalent to the average film thickness of positive electrode active material layer 2, and thin-layer portion 2a that is positioned at one edge of positive electrode active material layer 2 and that is smaller in thickness than thick-layer portion 2b. Thin-layer portion 2a is a portion where applying the slurry that contains the positive electrode active material on positive electrode current collector 3 is started. The thicknesses of thin-layer portion 2a and thick-layer portion 2b are set such that the sum of the thickness of thin-layer portion 2a and the thickness of insulating member 40, in which a part is disposed on thin-layer portion 2a, is equal to or less than the average thickness of thick-layer portion 2a.

Figure 5:
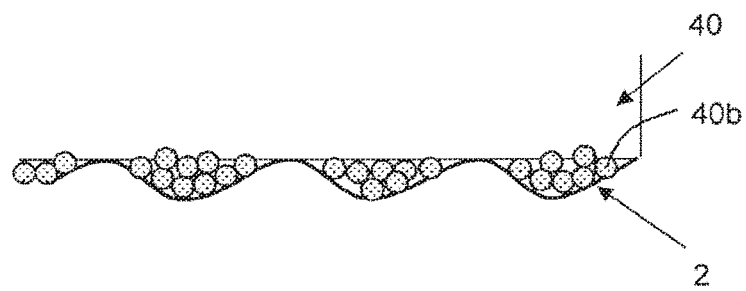
FIG. 5 is a diagram for describing a step in which positive electrode active material is applied to a positive electrode current collector.

In the following, the step of applying the slurry containing the positive electrode active material to positive electrode current collector 3 will be briefly described with use of FIG. 5. As schematically shown in FIG. 5, positive electrode current collector 3 is held on back roll 600. The slurry supplied from supplier 500 to die head 12 is discharged from discharge port 12a of die head 12, and is attached to positive electrode current collector 3. Then, the slurry is dried and solidified, so that positive electrode active material layer 2 is formed.

[Step of Making an Insulation Member]

Figure 6:
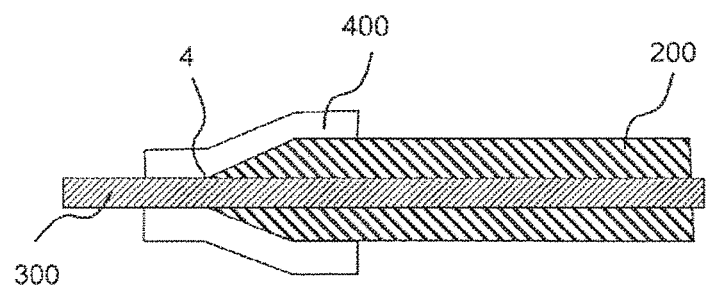
FIG. 6 is a diagram for describing a step of making an insulating member.

A step of making insulating member 40 will be described with reference to FIG. 6.

In the exemplary embodiment, discharge device 5 discharges resin solution 40a containing metal oxide 40b (see FIG. 7) toward border portion 4, and thereby, resin solution 40a is attached to border portion 4. Then, resin solution 40a is solidified, so that insulating member 40 is formed as shown in FIG. 4.

In the exemplary embodiment, metal oxide 40b (solid insulating material) is contained in resin solution 40a (insulating solution), and thereby, the surface tension of the resin solution 40a is decreased. Thereby, the wettability between resin solution 40a and the active material layer (positive electrode active material layer 2, negative electrode active material layer 8) is improved, and therefore, after resin solution 40a solidifies, insulating member 40 is prevented from easily peeling off from the active material layer.

In the following, the reason why the wettability between resin solution 40a and the active material layer is improved will be described with use of the following Formula (1). Formula (1) is the so-called Young's formula. $\theta$ represents the contact angle when liquid is in contact with a solid surface. $\gamma_s$ represents the surface tension that acts on the interface between a solid and a gas. $\gamma_{LS}$ represents the surface tension that acts on the interface between a solid and a liquid. $\gamma_L$ represents the surface tension that acts on the interface between a liquid and a gas.

$$\cos \theta = (\gamma_s - \gamma_{LS})/\gamma_L \quad (1)$$

In Formula (1), when the value of COS $\theta$ increases and approaches 1, the contact angle $\theta$ approaches 0 degrees and the wettability is improved. One conceivable method to increase the value of COS $\theta$, is to decrease the surface tension $\gamma_L$. That is, because the solid (metal oxide 40b) is contained in the liquid (resin solution 40a), the surface tension $\gamma_L$ decreases, and the contact angle $\theta$ approaches 0 degrees. As a result, the wettability of the liquid is enhanced, and insulating member 40 is prevented from being easily peeled off from the active material layer.

Figure 7:
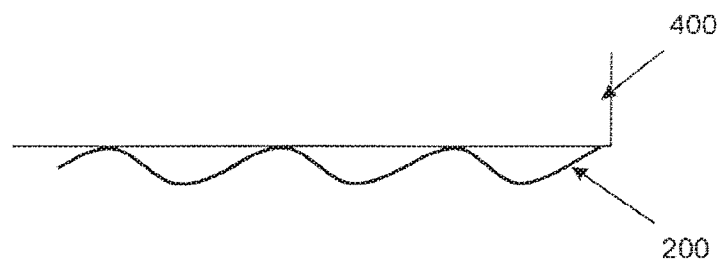
FIG. 7 is an enlarged view of the interface between the insulating member and the positive electrode active material layer in the positive electrode shown in FIG. 4.

FIG. 7 is an enlarged view of the interface between insulating member 40 and positive electrode active material layer 2.

As shown in FIG. 7, concavities and convexities formed by active material particles are generated on the surface of positive electrode active material layer 2. In the exemplary embodiment, a material having a particle diameter (50 nm to 500 nm) that allows entry to the concavities is used as metal oxide 40b. Since metal oxide 40b that has a particle diameter of 50 nm to 500 nm is contained in resin solution 40a, it is possible to further enhance the adhesion to positive electrode active material layer 2.

According to the exemplary embodiment, since insulating member 40 is prevented from being easily peeled off of positive electrode active material layer 2, it is possible to improve safety measures that can prevent the occurrence of a short circuit in the secondary battery. Further, in the exemplary embodiment, insulating member 40 is not attached to thick-layer portion 2b of positive electrode active material layer 2, but is attached to thin-layer portion 2a, and therefore, it is possible to prevent an increase in the thickness of the entire electrode laminated assembly.

One example of the effect of the present invention is that the invention makes it possible to prevent the insulating member from being easily peeled off of the active material layer.

Thus, the present invention has been described with reference to the exemplary embodiment, but the present invention is not limited to the above configurations of the exemplary embodiment, and various modifications that can be understood by those skilled in the art can be performed in the configuration and detail of the present invention, within the scope of the present invention.

The present application claims priority based on Japanese Patent Application No. 2014-218149 filed on Oct. 27, 2014, and incorporates herein all the disclosures in Japanese Patent Application No. 2014-218149.

EXPLANATION OF NUMERALS

1 Positive electrode (electrode)
2 Positive electrode active material layer (active material layer)
3 Positive electrode current collector (current collector)
4 border portion
40 insulating member
40a insulating solution
40b solid insulating material

The invention claimed is:

1. A production method of an electrode for a secondary battery, the secondary battery having an electrode laminated assembly that has a configuration in which electrodes and a separator are laminated,
   each of the electrodes including an application portion and a non-application portion, the application portion being a portion where an active material layer is formed on a current collector, the non-application portion being a portion where the active material layer is not formed on the current collector,
   the production method comprising forming an insulating member on a border portion between the application portion and the non-application portion by attaching an insulating solution to the border portion and then solidifying the insulating solution, the insulating solution containing a solid insulating material, and
   a particle diameter of the solid insulating material being 50 nm to 500 nm, wherein
   a resin solution is used as the insulating solution, and a metal oxide is used as the solid insulating material, and
   a concentration of a resin in the resin solution is 0.5 wt % to 5 wt %, and a content of the metal oxide in the resin solution is 1 wt % to 5 wt %.

2. The production method of the electrode for the secondary battery according to claim 1, wherein the insulating solution is discharged toward the border portion to be attached to the border portion.

3. The production method of the electrode for the secondary battery according to claim 1, wherein one oxide from among titanium dioxide, aluminum oxide and zirconium oxide is used as the metal oxide.

4. An electrode for a secondary battery comprising:
a current collector;
an active material layer that is formed on a part of said current collector; and
an insulating member that results from attaching an insulating solution to a border portion between an application portion and a non-application portion and then solidifying the insulating solution, the insulating solution containing a solid insulating material, the application portion being a portion where said active material layer is formed on said current collector, the non-application portion being a portion where said active material layer is not formed on said current collector, and
a particle diameter of the solid insulating material being 50 nm to 500 nm, wherein the insulating solution is a resin solution, and the solid insulating material is a metal oxide, and a concentration of a resin in the resin solution is 0.5 wt % to 5 wt %, and a content of the metal oxide in the resin solution is 1 wt % to 5 wt %.

5. The electrode for the secondary battery according to claim 4, wherein the solid insulating material enters a concave portion formed on a surface of said active material layer.

6. The electrode for the secondary battery according to claim 4, wherein the metal oxide is titanium dioxide, aluminum oxide, or zirconium oxide.

7. A secondary battery comprising: an electrode laminated assembly that has a configuration in which electrodes and a separator are laminated; and an outer container that accommodates said electrode laminated assembly together with electrolyte, at least one of the electrodes included in said electrode laminated assembly being the electrode for the secondary battery according to claim 4.

* * * * *